(12) United States Patent
Preem

(10) Patent No.: US 12,240,563 B2  
(45) Date of Patent: Mar. 4, 2025

(54) AIR SUPPLY SYSTEM FOR A HULL OF A VESSEL AND A VESSEL COMPRISING THE AIR SUPPLY SYSTEM

(71) Applicant: MAERSK A/S, Copenhagen K (DK)

(72) Inventor: Mikkel Preem, Ballerup (DK)

(73) Assignee: MAERSK A/S, Copenhagen K (DK)

(*) Notice: Subject to any disclaimer, the term of this patent is extended or adjusted under 35 U.S.C. 154(b) by 169 days.

(21) Appl. No.: 18/028,488

(22) PCT Filed: Sep. 30, 2021

(86) PCT No.: PCT/EP2021/076940  
§ 371 (c)(1),  
(2) Date: Mar. 24, 2023

(87) PCT Pub. No.: WO2022/069627  
PCT Pub. Date: Apr. 7, 2022

(65) Prior Publication Data  
US 2023/0365230 A1    Nov. 16, 2023

(30) Foreign Application Priority Data

Oct. 1, 2020   (DK) .............................. PA202070670

(51) Int. Cl.  
B63B 1/38         (2006.01)

(52) U.S. Cl.  
CPC .......... B63B 1/38 (2013.01); *B63B 2001/385* (2013.01)

(58) Field of Classification Search  
CPC ..................... B63B 2001/385; B63B 2001/387  
See application file for complete search history.

(56) References Cited

U.S. PATENT DOCUMENTS

| | | | | |
|---|---|---|---|---|
| 9,102,383 | B2* | 8/2015 | Takano | B63B 1/38 |
| 2023/0331349 | A1* | 10/2023 | Preem | F02B 37/013 |
| 2023/0365230 | A1* | 11/2023 | Preem | F02M 26/34 |

FOREIGN PATENT DOCUMENTS

| | | | | |
|---|---|---|---|---|
| DE | 102009022711 A1 * | 2/2011 | | B63B 1/38 |
| DE | 102017101055 A1 | 7/2018 | | |

(Continued)

OTHER PUBLICATIONS

Translation JP-2001048082-A (Year: 2024).*

(Continued)

*Primary Examiner* — J. Todd Newton  
(74) *Attorney, Agent, or Firm* — EIP US LLP

(57) ABSTRACT

Disclosed is an air supply system (100) for supplying air to an outside of a hull (201) of a vessel (200). The vessel comprises an engine. The air supply system comprises one or more turbocharger(s) (10) for supplying a compressed main air flow to the engine of the vessel via a respective first flow path (11A). The air supply system comprises an exhaust gas recirculation (EGR) system for recirculating exhaust gas into the compressed main airflow supplied to the engine via a second flow path (11B). The air supply system comprises a third flow path (11C) for supplying a sub-flow of compressed air to one or more Air Discharge Units (ADUs). The EGR system comprises a blower (31) arranged in the second flow path (11B) for supplying exhaust gas to the engine. The first flow path and the second flow path have a first connecting path (11AB) upstream of the blower (31) and a second connecting path (11BA) downstream of the blower. The third flow path is in fluid connection with the first flow path and the second flow path downstream of the blower, such that the sub-flow of compressed air can be extracted from the first flow path and/or the second flow path.

10 Claims, 13 Drawing Sheets

(56) References Cited

FOREIGN PATENT DOCUMENTS

| | | | | |
|---|---|---|---|---|
| DE | 102020117399 A1 | * | 1/2022 | ............... B63B 1/38 |
| EP | 3162690 A1 | | 5/2017 | |
| EP | 3162690 B1 | * | 3/2019 | ............... B63B 1/38 |
| EP | 3895973 A1 | * | 10/2021 | ............... B63B 1/38 |
| JP | H01301491 | * | 12/1989 | |
| JP | 2001048082 A | * | 2/2001 | |
| JP | 5022345 B2 | * | 9/2012 | ............... B63B 1/38 |
| JP | 2012171582 A | * | 9/2012 | ............... B63B 1/38 |
| JP | 2013129406 A | * | 7/2013 | |
| JP | 2013147089 A | | 8/2013 | |
| JP | 5294135 B1 | * | 9/2013 | |
| JP | 5631340 B2 | * | 11/2014 | |
| JP | 7428722 B2 | * | 2/2024 | ............... B63B 1/38 |
| KR | 20170140999 A | | 12/2017 | |
| KR | 20200055517 A | | 5/2020 | |
| KR | 20200061106 A | | 6/2020 | |
| KR | 102663786 B1 | * | 5/2024 | ............... B63B 1/38 |
| NL | 2026471 B1 | * | 10/2021 | ............... B63B 1/38 |
| WO | 2016006258 A1 | | 1/2016 | |
| WO | 2016157633 A1 | | 10/2016 | |

OTHER PUBLICATIONS

Translation JP-2012171582-A (Year: 2024).*
Translation JP-2013129406-A (Year: 2024).*
Translation JP-5022345-B2 (Year: 2024).*
Translation JP-5294135-B1 (Year: 2024).*
Translation JP-5631340-B2 (Year: 2024).*
Trasnalation JP-7428722-B2 (Year: 2024).*
Translation JP_H01301491_A (Year: 2024).*
Translation DE-102009022711-A1 (Year: 2024).*
Translation DE-102020117399-A1 (Year: 2024).*
Translation KR-102663786-B1 (Year: 2024).*
European Rule 71(3) Communication Intention to grant dated Jun. 7, 2024 for European Application No. 21786831.4.
International Search Report and Written Opinion dated Jan. 5, 2022 for International Application No. PCT/EP2021/076940.
Denmark Technical Examination and Search Report dated Mar. 26, 2021 for Denmark Application No. PA202070670.

* cited by examiner

AIR SUPPLY SYSTEM FOR A HULL OF A VESSEL AND A VESSEL COMPRISING THE AIR SUPPLY SYSTEM

CROSS-REFERENCE TO RELATED APPLICATIONS

This application is a 371 of International Application No. PCT/EP2021/076940, filed Sep. 30, 2021, which claims priority to Danish Application No. PA202070670 filed Oct. 1, 2020 under 35 U.S.C. § 119 (a). Each of the above-referenced patent applications is incorporated by reference in its entirety.

The present disclosure pertains to the field of propulsion of vessels. The present disclosure relates to an air supply system for supplying air to an outside of a hull of a vessel and a vessel comprising the air supply system. In particular the present disclosure relates to an air supply system comprising an exhaust gas recirculation system for providing air to the outside of the hull.

BACKGROUND

A vessel's resistance when moving through water is made up of multiple components, of which frictional resistance is the most dominant. Injection of an air flow into a turbulent boundary layer around the hull of the vessel may be used to reduce the frictional resistance of the hull of the vessel in the water. The turbulent boundary layer is located between stationary water and the moving water close to the hull of the vessel.

Air lubrication of the hull can reduce the frictional loss significantly. Depending on the type of propulsion used for the vessel, an efficiency of the vessel may be drastically improved. The efficiency gain is dependent on speed, hull form, draft of the vessel and/or a distribution and amount of air to a wetted surface of the vessel. The draft of the vessel is the vertical distance from the bottom of a keel of the vessel to the waterline and the wetted surface is the total area of the vessels outer surface in contact with the surrounding water.

The total net efficiency improvement depends on the power used to pressurize the air flow required to reduce the friction. Hence, a net propulsion efficiency is dependent on the power required to facilitate the air flow and a given discharge pressure at an air outlet in the hull. The discharge pressure may correspond to the water pressure from the water surrounding the vessel acting on the air outlet ports.

SUMMARY

Traditional air lubrication systems typically use electric compressors to generate air flow to the outside of the vessel. However, these known electric compressors are expensive, require maintenance and may have poor efficiency.

Accordingly, there is a need for an air supply system for supplying air to an outside of a hull of a vessel, which mitigates, alleviates or addresses the shortcomings existing and provides a simpler and more efficient air supply system.

Disclosed is an air supply system for supplying air to an outside of a hull of a vessel. The vessel comprises an engine, such as an internal combustion engine, such as a diesel engine, such as a two-stroke diesel engine. The engine may be a main engine of the vessel. The air supply system comprises one or more turbocharger(s) for supplying a compressed main air flow to the engine of the vessel via a respective first flow path. The air supply system comprises an exhaust gas recirculation (EGR) system for recirculating exhaust gas into the compressed main air flow supplied to the engine via a second flow path. The air supply system comprises a third flow path for supplying a sub-flow of compressed air to one or more Air Discharge Units (ADUs). The EGR system comprises a blower arranged in the second flow path for supplying exhaust gas to the engine. The first flow path and the second flow path have a first connecting path upstream of the blower and a second connecting path downstream of the blower, for providing a fluid connection between the first flow path and the second flow path. The third flow path is in fluid connection with the first flow path and the second flow path downstream of the blower, such that the sub-flow of compressed air can be extracted from the first flow path and/or the second flow path.

It is an advantage of the air supply system according to the present disclosure that the blower of the EGR system may be used for boosting the pressure of the sub-flow of compressed air provided to the ADUs for reducing the resistance of the vessel in the water. By boosting the pressure of the compressed flow of air using the blower of the EGR system, a release of air through the ADUs may be started even though the pressure of the compressed air from the turbochargers do not exceed the discharge pressure at the ADUs. Thus, an efficiency of the air supply system may be improved Disclosed is a vessel comprising an engine and the air supply system of this disclosure.

It is an advantage of the vessel according to the present disclosure that the blower of the EGR system may be used for boosting the pressure of the sub-flow of compressed air provided to the ADUs for reducing the resistance of the vessel in the water. By boosting the pressure of the compressed flow of air using the blower of the EGR system, a release of air through the ADUs may be started even though the pressure of the compressed air from the turbochargers do not exceed the discharge pressure at the ADUs, such as when the engine of the vessel is operating at a load below a load threshold. Thus, an efficiency of the vessel may be improved since a reduction of the resistance of the vessel in the water may be activated at lower speeds of the vessel.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Figure 1:
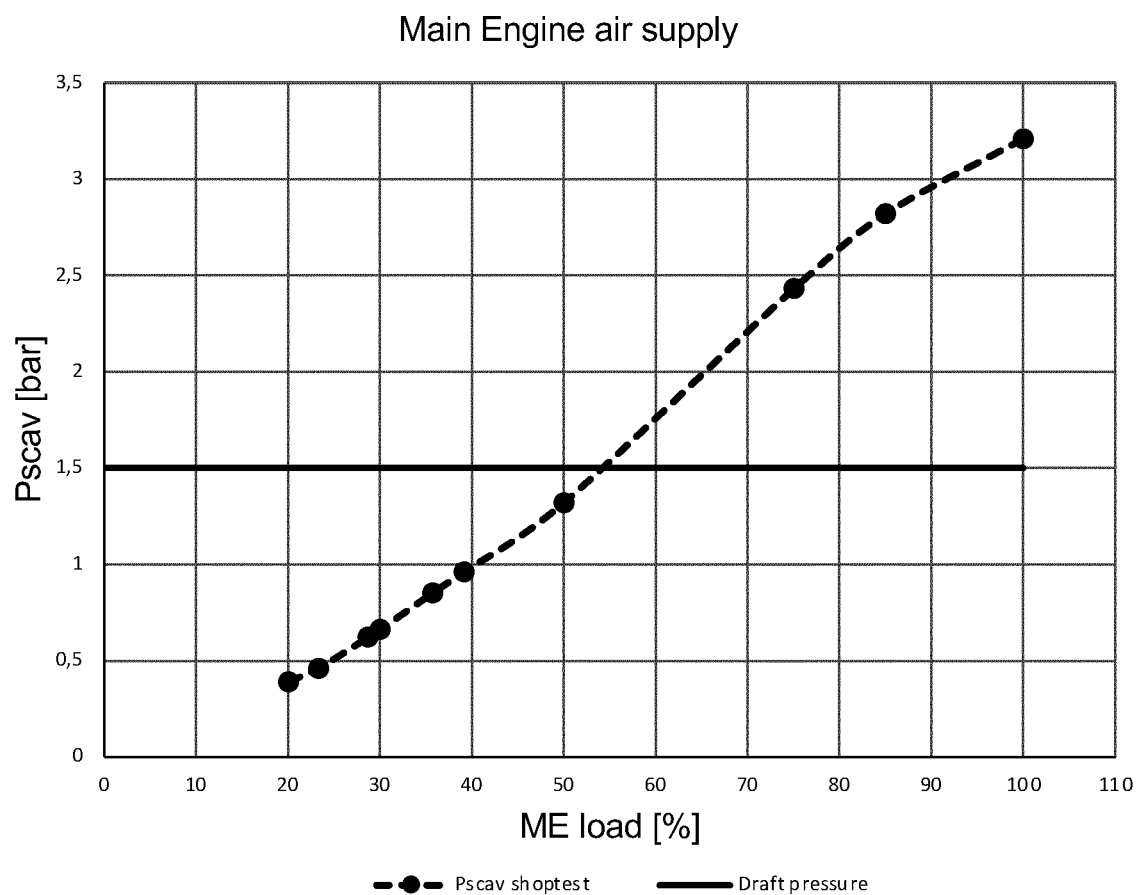
FIG. 1 is a graph showing scavenging pressure and draft pressure as a function of engine load for an example vessel.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The figures are schematic and simplified for clarity, and they merely show details which aid understanding the disclosure, while other details have been left out. Throughout, the same reference numerals are used for identical or corresponding parts.

An air supply system for supplying air to an outside of a hull of a vessel is disclosed. The vessel comprises an engine. The air supply system uses an EGR system for recirculating exhaust gas into a combustion process in the engine for generating a compressed air flow that is provided to a set of ADUs. The ADUs may be configured to be arranged on the hull of the vessel below a waterline of the vessel, such as on the wetted surface of the hull of the vessel. The compressed air provided to the ADUs may be released into a turbulent boundary layer of the water surrounding the vessel, to reduce the resistance of the vessel in the water. The air supply system comprises one or more turbocharger(s) for supplying a compressed main air flow to the engine of the vessel via a respective first flow path. The compressed main air flow, which may also be referred to as a scavenging air flow, is configured to be used in the combustion process of the engine. The air supply system comprises the EGR system for recirculating exhaust gas, such as exhaust gas from the engine, into the compressed main air flow supplied to the engine, via a second flow path. The air supply system comprises a third flow path for supplying a sub-flow of compressed air to one or more ADUs. The EGR system comprises a blower arranged in the second flow path for supplying exhaust gas to the engine. The blower increases the flow and the pressure of the fluid, such as the exhaust gas, flowing through the second flow path. The first flow path and the second flow path have a first connecting path upstream of the blower and a second connecting path downstream of the blower. The first connecting path and the second connecting path provide a fluid connection between the first flow path and the second flow path. The third flow path is in fluid connection with the first flow path and the second flow path downstream of the blower, such that the sub-flow of compressed air may be extracted from the first flow path and/or the second flow path. The flow paths, such as the first, the second and the third flow paths, being in fluid connection means that the flow paths are connected such as via the first and/or the second connecting path, so that a fluid may flow between the flow paths. The flow paths, mentioned herein, such as the first flow path, the second flow path and the third flow path, may be a plurality of pipes configured to allow a flow of a fluid from one location to a second location. The connecting path may e.g. be provided by means of a connecting pipe or by the first and the second flow paths, such as pipes of the first and the second flow paths, intersecting each other.

By connecting the first and the second flow paths via the first and/or the second connecting path, the flow of compressed air from the one or more turbocharger(s) may be rerouted from the first flow path via the blower of the EGR system, where the pressure of the compressed air is increased prior to being supplied to the ADUs via the third flow path. The pressure of the compressed air flow may thus be increased to above the discharge pressure at the ADUs, without having to use a dedicated blower. Thereby, the cost and complexity of the air supply system may be reduced, which in turn increase the total net efficiency of the vessel. The blower of the EGR system, may depending on the compression ratio required to increase the pressure of the compressed air to above the discharge pressure at the ADUs be either a blower or a compressor. The blower may operate at a lower compression ratio than the compressor, such as for example a ratio of 1.1 to 1.2 for the blower compared to a ratio greater than 1.2 for the compressor.

The sub-flow of compressed air may be extracted from the first flow path via the first connecting path and the blower of the EGR system in the second flow path. This may for example be done when the compressed air flow in the first flow path is below the discharge pressure at the ADUs, to increase the pressure of the compressed air using the blower of the EGR system. The sub-flow of compressed air may be extracted from the first flow path via the second connecting path, such as without passing the blower of the EGR system. This may for example be done when the compressed air flow in the first flow path is above the discharge pressure at the ADUs, to increase the pressure of the compressed air using the blower of the EGR system. The sub-flow of compressed air may further be extracted from the second flow path, such as from the exhaust gas receiver, via the blower of the EGR system. This may be used when the further reduction of emissions is required, and exhaust gas is fed to the combustion process via the second flow path and the second connecting path 11BA.

The EGR system significantly reduces the formation of Nitrogen Oxides (NOx) in diesel engines. The EGR system helps the vessel to meet the International Maritime Organisation (IMO) NOx Tier 3 standard emission limits applying to the North American and United States Caribbean Sea, as well as any new NOx Emission Control Areas (NECA). In the EGR system, after a cooling and cleaning process of the exhaust gas, such as by using a scrubber, a part of the exhaust gas is recirculated to the engine, such as to the scavenge air receiver of the engine. In this way, part of the oxygen in the scavenge air is replaced by Carbon Dioxide ($CO_2$) from the combustion process. By replacing some of the oxygen with $CO_2$, the $O_2$ content is decreased and the heat capacity of the scavenge air is increased, thus reducing the temperature peak of the combustion and the formation of NOx. The NOx reduction may be almost linear to the ratio of recirculated exhaust gas. IMO has also set a Tier 2 emission standard, which has less strict emission limits than the Tier 3 standard emission limits. The Tier 2 and Tier 3 NOx emission limits are defined in Regulation 13 of Annex VI of the "International Convention on the Prevention of Pollution from Ships", also known as MARPOL 73/78. The Tier 2 and 3 emission limits apply to marine diesel engines with a power output of more than 130 kW installed on a vessel.

The EGR system may comprise a scrubber for cleaning the exhaust gases, and the blower for increasing the pressure and/or the flow of the exhaust gas. In one or more example air supply systems, the scrubber may be arranged in the second flow path. The scrubber may be arranged upstream of the blower and the first connecting path between the first and the second flow path. The scrubber may be configured to cool the exhaust gas and remove contaminants, such as sulphur dioxide and particulate soot. In one or more example air supply systems, the EGR system may comprise a cooler, such as a separate cooler, for cooling the exhaust gases, and a water mist catcher for removing moisture from the exhaust gas. By cooling the exhaust gas, the temperatures of the combustion process can be reduced, and the density of the exhaust gas can be increased, which improves the volumetric efficiency. The water mist catcher may remove moisture due to condensation of the exhaust gas due to the cooling of the exhaust gas. Removing the moisture may reduce the risk of corrosion in the components of the air supply system, such as in the flow paths or the blower.

In one or more example air supply systems, the air supply system may comprise a first flow control device for controlling a flow through the first connecting path between the first flow path and the second flow path. In one or more example air supply systems, the air supply system may comprise a second flow control device for controlling a flow through the second connecting path between the first flow path and the second flow path. In one or more example air supply systems, the air supply system may comprise a third flow control device for controlling a flow through the third flow path. In one or more example air supply systems, the air supply system may comprise a fourth flow control device for controlling a flow of exhaust gas into the second flow path. The flow control device(s), such as the first, the second, the third and/or the fourth flow control device may be an orifice or a control valve. The flow control device(s), such as the first, second, third and/or fourth flow control device, allow the flow of compressed air to be directed through different flow paths depending on the operating condition of the air supply system. By opening and closing different flow control device(s) the flow paths available for the compressed flow may be adapted. The flow control device(s) may be controlled based on an engine load, a pressure of the compressed air flow provided by the turbocharger, the discharge pressure at the ADUs and/or a flow rate of the compressed air flow. In some example air supply systems, the air supply system may comprise one or more sensors for monitoring the engine load, the pressure of the compressed air flow provided by the turbocharger, the discharge pressure at the ADUs and/or the flow rate of the compressed air flow.

The flow control device may in one or more example air supply systems be a fixed orifice, such as a fixed ratio orifice, configured to passively control the flow through the flow path. In one or more example air supply systems, the third flow control device may be an orifice such as a fixed ratio orifice, configured to extract a fraction of the fluid, such as the compressed air, flowing through the first and/or the second flow path. The orifice may e.g. be configured to extract 0-20%, such as 6-10%, of the fluid flowing through the first and/or the second flow path and provide it to the third flow path for supplying a sub-flow of compressed air to one or more ADUs. The fixed ratio orifice can ensure that only a predetermined amount of compressed air flow is extracted from the first flow path, such that a sufficient amount of compressed air is supplied to the engine of the vessel to allow cooling of the engine and combustion of the fuel injected into the combustion chamber of the engine.

In one or more example air supply systems, the flow control device may be variable, such as being a control valve, such as a diaphragm control valve, which can actively control the amount of gas allowed to be extracted to the air supply system.

In one or more example air supply systems, the first, second and fourth flow control device may be control valves. Thereby, the flow through the valves can be controlled in order to change the route of the flow of air through the flow paths and connecting paths of the air supply system.

The one or more turbochargers may comprise a turbine driven by an exhaust gas flow from the combustion engine, such as from the exhaust gas receiver of the engine, and a compressor for generating the compressed air flow, such as a scavenging air flow. The energy from the exhaust gas may thus be used to compress the flow of air.

In one or more example air supply systems, the air supply system may comprise two or more turbocharger(s). The air supply system may further comprise one or more cut out valves for controlling an exhaust gas flow to at least a first turbocharger of the two or more turbochargers. The one or more cut-out valves may be used for turning on or off a gas flow to a turbine side and/or from a compressor side of at least one of the two or more turbocharger(s). By turning off an exhaust gas flow to the turbine side of the at least one of the turbochargers by closing the cut-out valves a larger flow of exhaust gas may be provided to the remaining turbochargers, thereby increasing their compressing capacity, which will increase the pressure generated by the active turbocharger(s). By cutting out a first of the two or more turbochargers, all of the exhaust gas will flow through one or more second of the plurality of turbochargers, which may also be referred to as one or more active turbocharger(s). Since the available exhaust gas flow has to drive a smaller number of turbochargers, the exhaust gas flow to each of the active turbochargers, such as the turbochargers that have not been cut-out, will increase. The increase in exhaust gas to the one or more active turbochargers causes them to spin faster which will increase the pressure of the compressed air from the compressor side of these turbochargers through the first flow path. The higher exhaust gas pressure to the one or more active turbocharger(s) will increase the turbocharger efficiency and may thus allow a higher air pressure to flow through the first flow path to the engine, compared to a scenario where all of the turbochargers are active.

In a first example operating mode of the air supply system, the first flow control device, such as a control valve, and the third flow control device, such as a control valve, may be configured to be open. The second flow control device and the fourth flow control device are configured to be closed. Thereby, a flow of exhaust gas through the second flow path is prevented and a sub-flow of air is extracted from the first flow path and routed via the first connecting path via the blower of the EGR system to the ADUs. By routing the sub-flow of air through the first connecting path, the sub-flow of air is routed through the blower of the EGR system, where the sub-flow of air is compressed. The pressure of the sub-flow of air may thereby be increased to a pressure above the discharge pressure at the ADUs by the blower of the EGR system. Thereby, the discharge of compressed air through the ADUs may be started at lower engine loads. The increase of the pressure of the compressed air may also be performed without the use of a dedicated blower for the air supplied to the ADUs. Existing blower may be used.

In a second example operating mode of the air supply system, such as when the load of the engine is low, such as below a load threshold, the one or more cut out valves may be closed, so that the exhaust gas flow to at least the first turbocharger of the two or more turbochargers is prevented. Thereby, the pressure of the compressed air in the first flow path generated by the one or more second, active, turbochargers is increased. Thus, the air provided to the blower will also be higher, which reduces the work required by the booster to increase the pressure above the discharge pressure at the ADUs.

In a third example operating mode of the air supply system, such as when the load of the engine is high, such as above a load threshold, the one or more cut out valves may be open, so that the exhaust gas flow to at least the first turbocharger of the two or more turbochargers is allowed. Thereby, a higher flow of compressed air may be provided to the first flow path for supplying the compressed main air flow to the engine, when the engine is operating at higher loads.

In a fourth example operating mode of the air supply system, such as when the vessel is operating in a Tier 3 NOx emission mode, the first flow control device and the third flow control device may be configured, such as be controlled, to be closed and the second flow control device and fourth flow control device may be configured, such as be controlled, to be open. Thereby, a flow of exhaust gas through the second flow path is allowed and the exhaust gas is fed into the first flow path via the blower of the EGR system and the second connecting path.

In a fifth operating mode, such as when the vessel is operating in a Tier 3 NOx emission mode, the second flow control device and the third flow control device and the fourth flow control device are configured to be open and the first flow control device is configured to be closed, so that a flow of exhaust gas through the second flow path is allowed and fed into the first flow path and the third flow path via the blower of the EGR system and the second connecting path. Thereby, the emissions from the combustion process may be reduced while simultaneously reducing the friction of the vessel in the water by discharging air through the ADUs.

A vessel comprising the air supply system according to the current disclosure is further disclosed.

FIG. 1 illustrates an example of a pressure of the compressed air, such as a scavenging air (Pscav), provided to the engine by the one or more turbocharger(s) as a function of engine load. The discharge pressure at the ADUs is indicated by the draft pressure line in FIG. 1. The discharge pressure at the ADUs is dependent on their location on the hull. When the ADUs are arranged at the bottom of the hull, the discharge pressure corresponds to the draft pressure of the vessel. In order for air to be released to the outside of the hull of the vessel via the ADUs, the pressure of the compressed air has to overcome the discharge pressure at the ADUs. As can be seen in FIG. 1, the pressure of the compressed air is below the discharge pressure at the ADUs for engine loads below approximately 55%. For an air supply system using only compressed air provided by the turbochargers according to the example shown in FIG. 1, air would only be released at engine loads above 55%. In the following, an air supply system will be disclosed which allows a discharge of air to the outside of the hull of the vessel also at lower engine loads.

In the following figures, dashed lines represent the flow of compressed air through the air supply system, black valves represent a closed valve preventing a flow through the vale and white valves represent an open valve allowing a flow through the valve.

Figure 2:
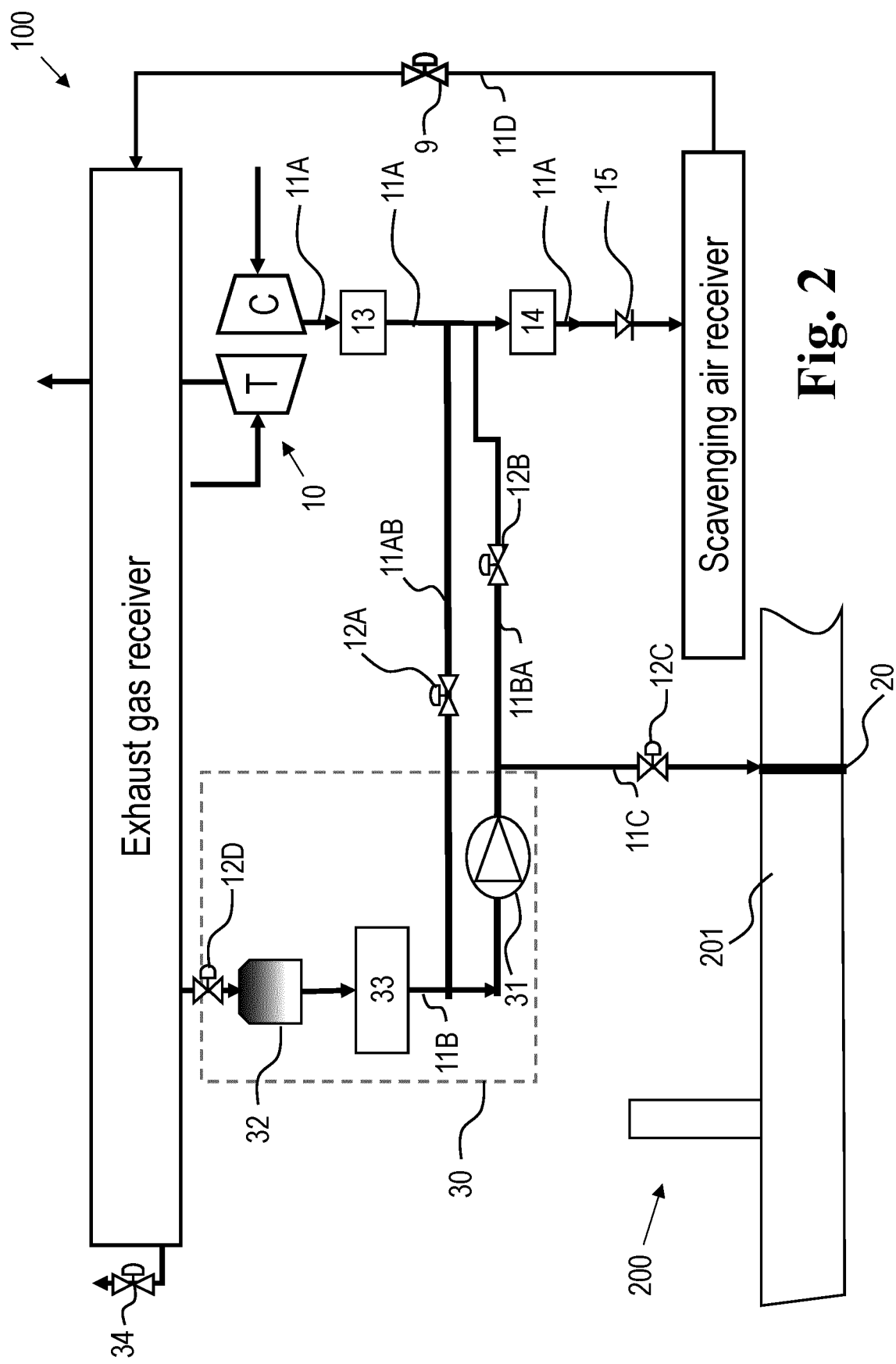
FIG. 2 illustrates an example air supply system comprising a single turbocharger according to this disclosure.

FIG. 2 illustrates an example air supply system 100 for supplying air to an outside of the hull 201 of a vessel 200 according to the current disclosure. The vessel 200 comprises an engine, such as an internal combustion engine, such as a diesel engine, such as a two-stroke diesel engine. The engine is not disclosed in FIG. 2 but is indicated by the exhaust gas receiver for receiving exhaust from the engine and the scavenging air receiver for providing scavenging air to the engine, which are both peripheral to the engine. The air supply system 100 comprises a turbocharger 10 for supplying a compressed main air flow, such as a scavenging air flow, to the engine of the vessel 200 via a first flow path 11A. The turbocharger 10 may be driven by exhaust gas from the exhaust gas receiver. In order to prevent the turbocharger from overrevving, the air supply system 100 may comprise an exhaust gas bypass valve 34 for releasing exhaust gas in order to reduce the flow of exhaust gas to the turbocharger 10. The first flow path 11A may also be referred to as a scavenging flow path. The first flow path may comprise an air cooler 13 for cooling the compressed air from the turbocharger 10, a water mist catcher 14 for removing moisture from the compressed air flow, and/or a non-return valve 15 for preventing contaminated air from the combustion process to flow from the scavenging air receiver backwards towards the turbocharger 10. The water mist catcher 14 may be arranged downstream of the air cooler 13 in the first flow path 11A. The non-return valve 15 may be arranged downstream of the water mist catcher 14 in the first flow path 11A. The air supply system 100 comprises an EGR system 30 for recirculating exhaust gas into the compressed main air flow of the first flow path via a second flow path 11B. The EGR system may comprise a scrubber 32 for cleaning the exhaust gas, an EGR cooler 33 for cooling the exhaust gas and a blower 31 arranged in the second flow path 11B for supplying exhaust gas to the engine, such as to the scavenging air receiver. The scrubber 32 may be arranged in the second flow path 11B upstream of the blower 31 and the first connecting path 11AB. The EGR system 30 may use the water mist catcher 14 in the first flow path 11A for removing moisture from the exhaust gas. The exhaust gas from the EGR system 30 may thus be routed via the water mist catcher 14 in the first flow path 11A. The air supply system 100 comprises a third flow path 110 for supplying a sub-flow of compressed air to one or more ADUs 20. The one or more ADUs 20 are configured to be arranged in the hull 201 of the vessel 200 below a waterline. The first flow path 11A and the second flow path 11B have a first connecting path 11AB upstream of the blower 31 and a second connecting path 11BA downstream of the blower 31. The third flow path 110 is in fluid connection with the first flow path 11A and the second flow path 11B downstream of the blower 31, such that the sub-flow of compressed air may be extracted from the first flow path 11A and/or the second flow path 11B. The sub-flow of compressed air may be extracted from the first flow path 11A via the first connecting path 11AB, the second flow path 11B and the blower 31 of the EGR system 30. The sub-flow of compressed air may also be extracted from the first flow path 11A via the second connecting path 11AB, without passing through the blower 31 of the EGR system 30. The sub-flow of compressed air may be extracted from the second flow path 11B, such as from the exhaust gas receiver, via the blower 31 of the EGR system 30. In some example air supply systems 100, the air supply system may comprise a cylinder bypass path 11D connecting the scavenging air receiver and the exhaust gas receiver. The air supply system may comprise a cylinder bypass valve 9 for controlling the air flow through the cylinder bypass path.

The cylinder bypass 11D may allow excess air to bypass the combustion process. The cylinder bypass valve 9 may be opened at a high load of engine, when the air supply system comprises only a single turbocharger, to compensate for a reduced flow capacity of the single turbocharger.

The air supply system 100 may comprise a first flow control device 12A for controlling, such as opening and/or closing, a flow through the first connecting path 11AB between the first flow path 11A and the second flow path 11B, a second flow control device 12B for controlling a flow through the second connecting path 11BA between the first flow path 11A and the second flow path 11B, a third flow control device 12C for controlling a flow through the third flow path 110, and/or a fourth flow control device 12D for controlling a flow of exhaust gas into the second flow path 11B. The first, second, third and fourth flow control devices 11A-D are in the example shown here, control valves. However, the flow control devices, such as the third flow control device 12C may also be an orifice having a fixed flow rate. The first flow control device 12A is arranged in the first connecting path 11AB between the first flow path 11A and the second flow path 11B. The second flow control device 12B is arranged in the second connecting path 11BA between the second flow path 11B and the first flow path 11A.

Figure 3:
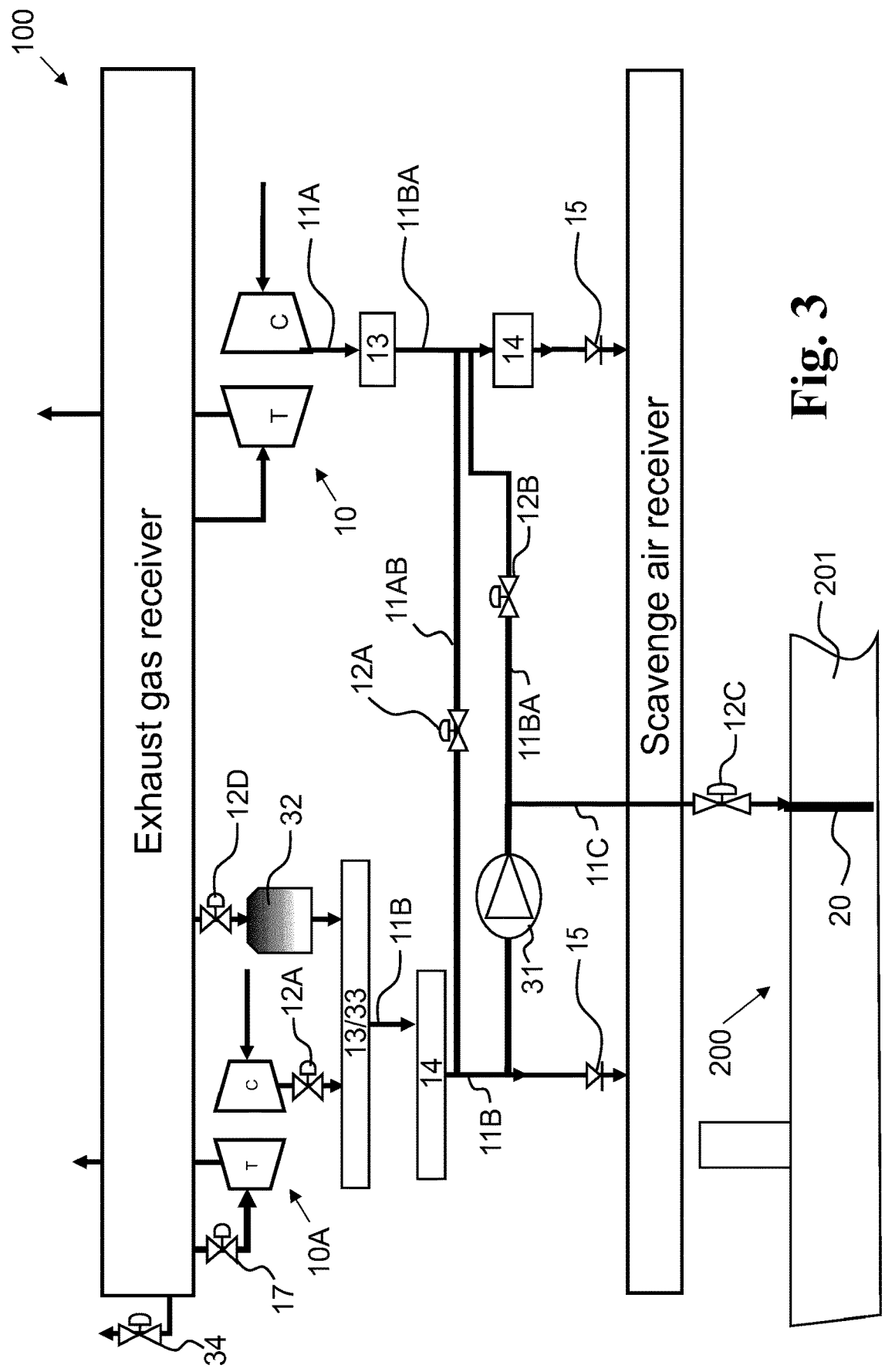
FIG. 3 illustrates an example air supply system comprising a plurality of turbocharger(s) according to this disclosure.

FIG. 3 illustrates an example air supply system 100 for supplying air to an outside of the hull 201 of a vessel 200 according to the current disclosure. The example air supply system 100 of FIG. 3 differs from the example air supply system of FIG. 2 in that the air supply system 100 comprises two or more turbocharger(s) 10, such as a first turbocharger 10 and a second turbocharger 10A. The air supply system 100 further comprises one or more cut out valves 17 for controlling an exhaust gas flow to at least the first turbocharger 10A of the two or more turbochargers 10, 10A. By closing the cut-out valve 17 the exhaust gas flow to the first turbocharger 10A can be turned off. This allows a larger flow of exhaust gas to be provided to the remaining turbochargers, such as the first turbocharger 10. By cutting out a first of the two or more turbochargers, all of the exhaust gas will flow through the first turbocharger 10, which may also be referred to as the active turbocharger(s). Since the available exhaust gas flow has to drive a smaller number of turbochargers, the exhaust gas flow to the first turbocharger 10 will increase. The increase in exhaust gas to the active turbochargers causes the active turbocharger to spin faster, which will increase the pressure of the compressed air from this turbocharger through the flow path 11A, compared to a scenario where all of the turbochargers 10, 10A are active. The second turbocharger 10A may be of a different size than the first turbocharger 10. The second turbocharger 10A may provide the compressed air to the scavenging air receiver via a dedicated flow path. In the example air supply system 100 shown in FIG. 3, the second turbocharger may share the flow path with the EGR system 30, such that the compressed air from the second turbocharger 10A is provided to the scavenging air receiver via the second flow path 11B. The EGR system 30 and the second turbocharger 10A may thus share the cooler and the water mist catcher 14. The air cooler 13 for the second turbocharger 10A and the EGR cooler 33 may thus be the same cooler. The second turbocharger 10A and the EGR system 30 may not use second flow path simultaneously. The second flow path may thus be used either by the second turbocharger 10A or by the EGR system 30. The first turbocharger 10 may thus be used together with the EGR without the second turbocharger 10A or with the second turbocharger 10A but without the EGR. The second turbocharger may be sized, which may also be referred to as being matched, for the maximum allowable EGR flow through the second flow path. The engine may thus either receive a flow of gas from the second flow path 11B comprising normal air from the second turbocharger 10A, such as during Tier 2 operation, or cleaned exhaust gas with reduced O2 content from the EGR system, such as from the scrubber 32, during Tier 3 operation. The flow rate of the two different flows may be substantially the same, but the O2 content may differ.

Figure 4:
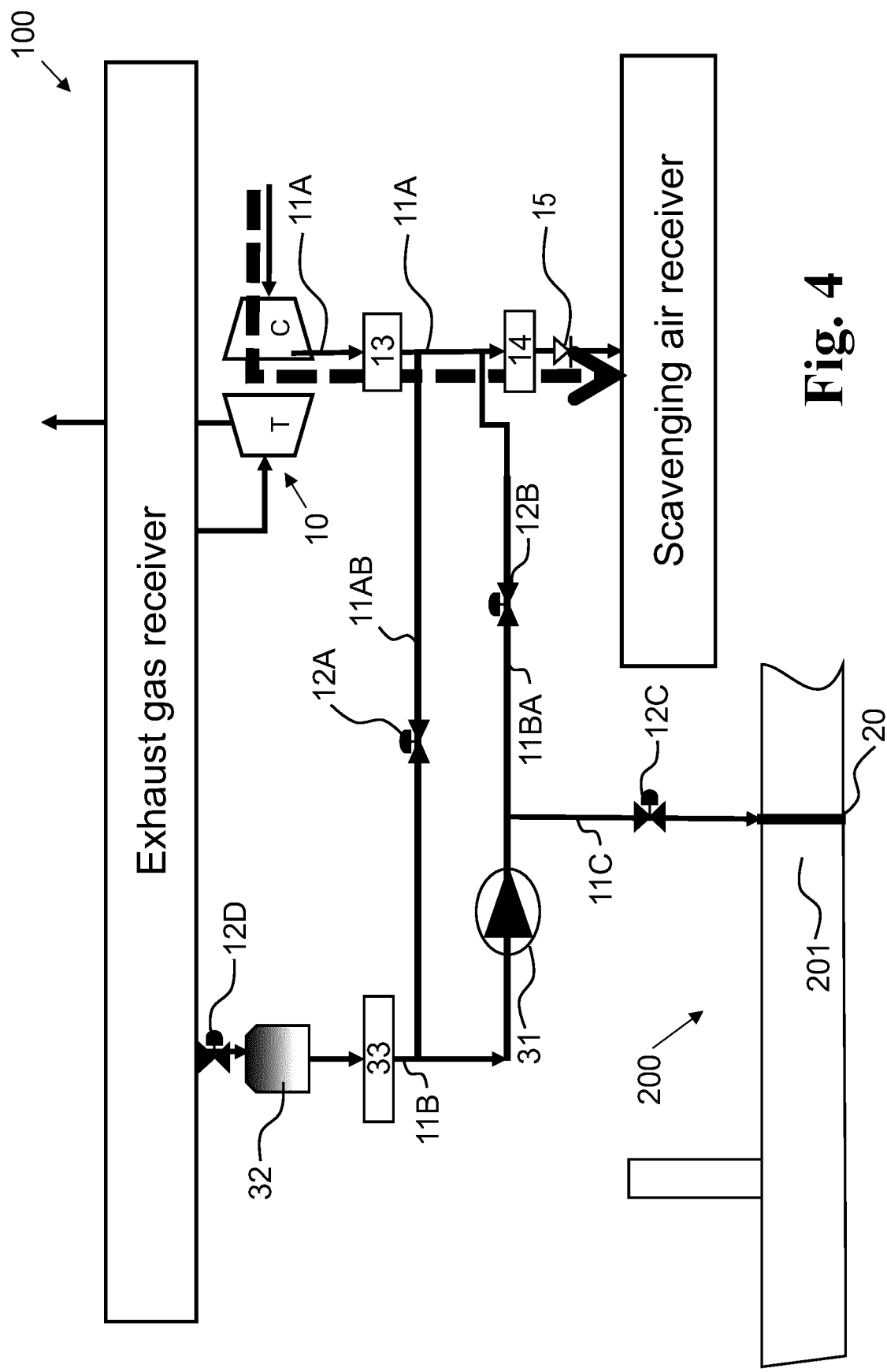
FIGS. 4-12 illustrate different exemplary operating modes for an air supply system according to this disclosure.

FIG. 4 discloses an example operating mode of the air supply system disclosed herein. In this example operating mode, the air supply system operates in IMO Tier 2 mode without air being supplied to the ADUs 20. In this operating condition, the flow control devices 12A and 12B are both closed, which is indicated in FIG. 3 with the valves being black. The compressed air flow, indicated by the dashed arrow, thus follows the first flow path 11A, such as the scavenging flow path, from the turbocharger to the scavenging air receiver. No flow of compressed air will pass through the connecting paths 11AB, 11BA, through the second flow path 11B or through the third flow path 110.

Figure 5:
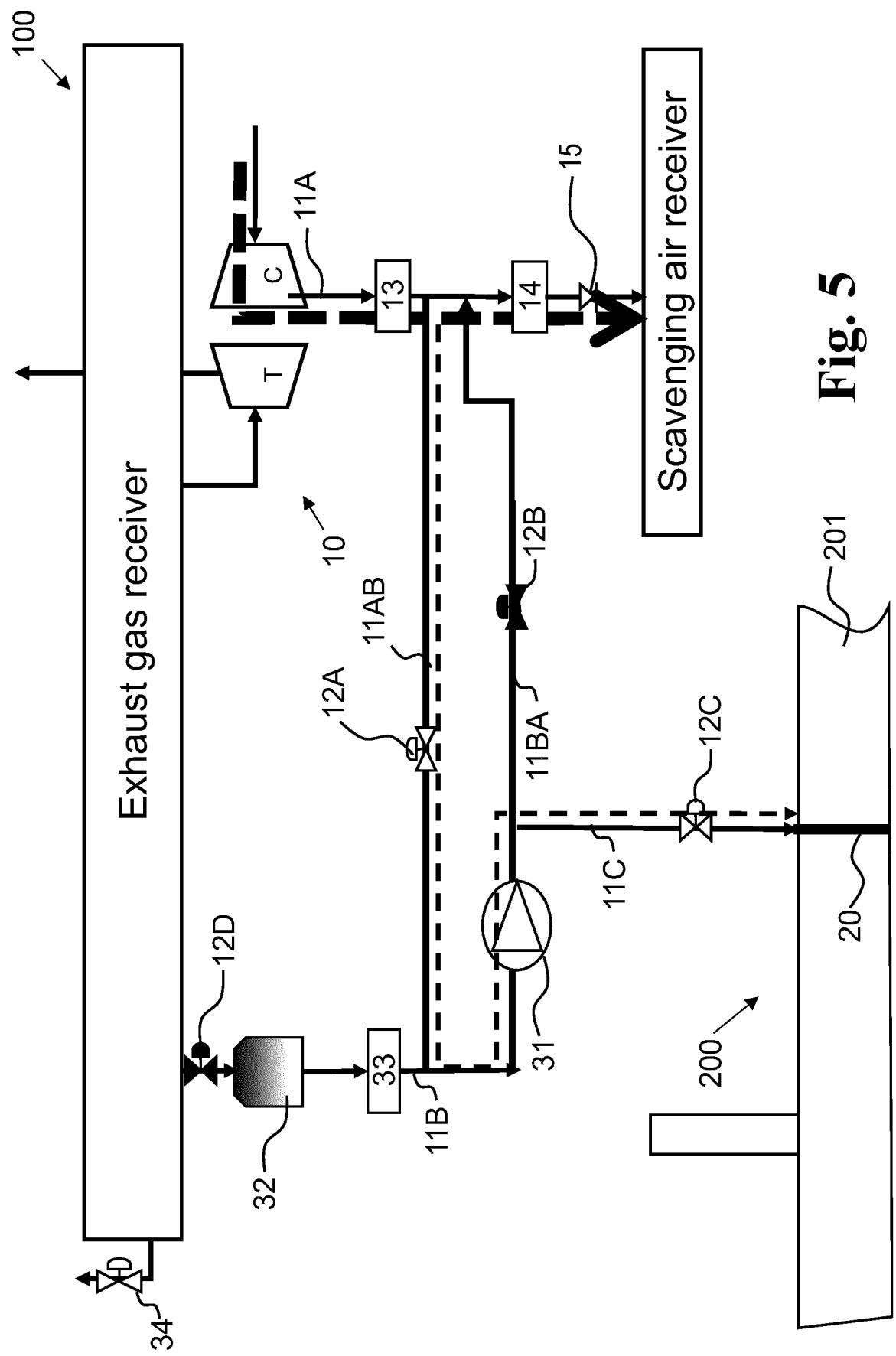

FIG. 5 discloses an example operating mode of an example air supply system disclosed herein. In this example operating mode, the air supply system 10 operates in IMO Tier 2 mode with air being supplied to the ADUs 20. The engine of the vessel may operate at a load below the load threshold, so that the pressure of the compressed air from the turbocharger 10 is not sufficient to overcome the discharge pressure at the ADUs 20. In this operating mode, the first flow control device 12A and the third flow control device 12C are configured to be opened, as indicated by the valves being white in the figure. The second flow control device 12B and the fourth flow control device 12D are configured to be closed, so that a flow through the second connecting path 11BA and a flow of exhaust gas through the second flow path is prevented. A sub-flow of air is extracted from the first flow path 11A through the first connecting path 11AB and routed via the first connecting path 11AB via the second flow path 11B to the blower 31 of the EGR system 30, where the pressure of the sub-flow of air is boosted by the blower to a pressure above the discharge pressure at the ADUs 20. When the pressure of the sub-flow of air has been increased by the blower to a pressure level higher than the discharge pressure at the ADUs, the sub-flow of air may overcome the discharge pressure at the ADUs and may flow through the third flow path 110 via the third flow control device 12C to the one or more ADUs 20. The third flow control device 12C may be throttled to provide a target flow for the ADUs 20.

Figure 6:
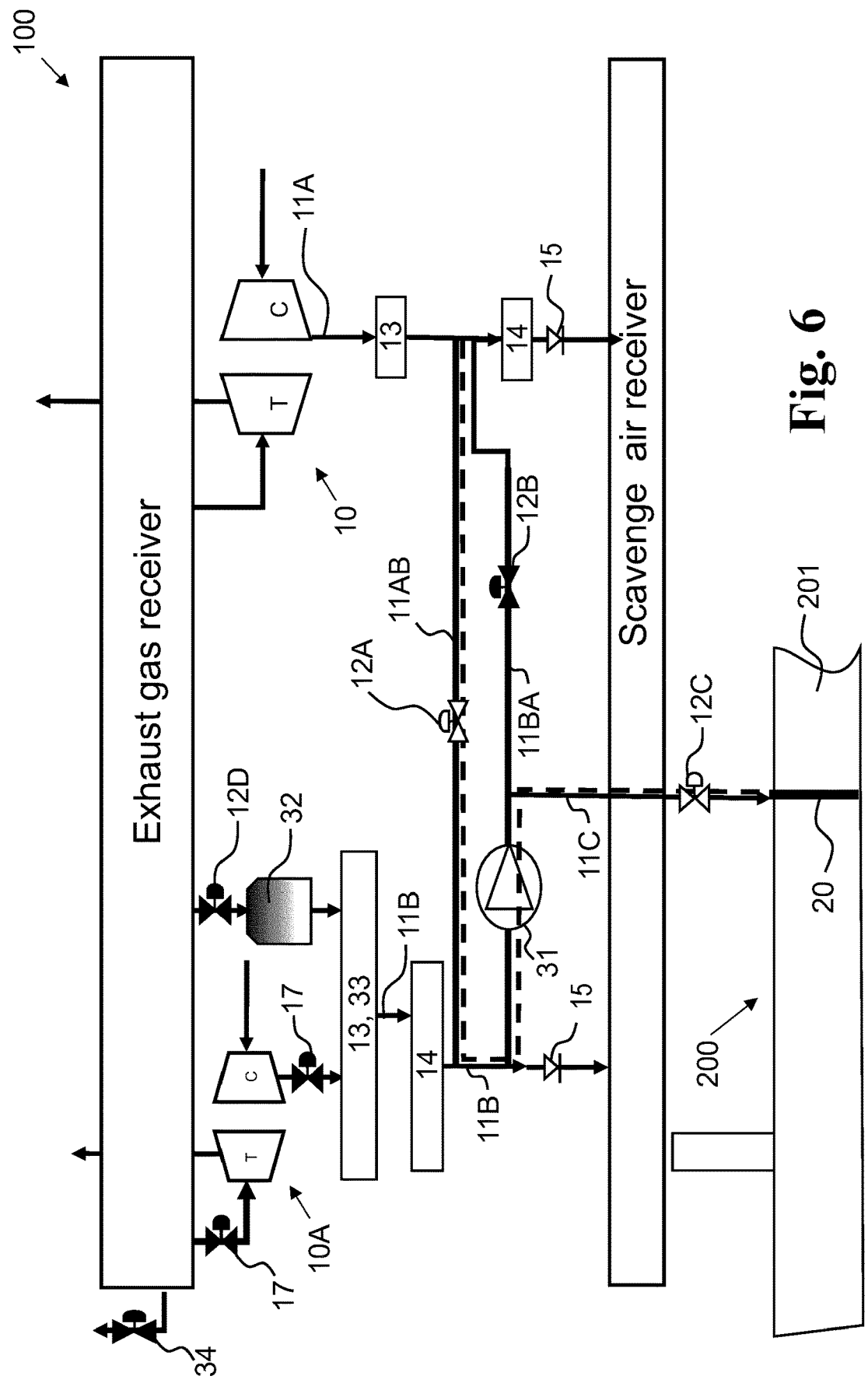

FIG. 6 shows the same operating mode as shown in FIG. 5, but for an air supply system 100 comprising more than one turbocharger, such as the air supply system 100 shown in FIG. 3. For the example air supply system comprising more than one turbocharger, such as comprising the first turbocharger 10 and the second turbocharger 10A, the one or more cut out valves 17 may, while the pressure of the compressed air is below the discharge pressure at the ADUs, be closed as indicated by the black valves in FIG. 6, so that the exhaust gas flow to at least the turbocharger 10A of the two or more turbochargers 10, 10A is prevented. This increases the exhaust gas flow to the remaining active turbochargers, such as to the turbocharger 10 of the two or more turbochargers 10, 10A. The first flow control device 12A and the third flow control device 12C are configured to be open, as indicated by the valves being white in the figure. The second flow control device 12B and the fourth flow control device 12D are configured to be closed, so that a flow through the second connecting path 11BA and a flow of exhaust gas through the second flow path is prevented. A sub-flow of air is extracted from the first flow path 11A through the first connecting path 11AB and routed via the second flow path 11B to the blower 31 of the EGR system 30, where the pressure of the sub-flow of air is boosted by the blower to a pressure above the discharge pressure at the ADUs 20. When the pressure of the sub-flow of air has been increased by the blower to a pressure level higher than the discharge pressure at the ADUs, the sub-flow of air may overcome the discharge pressure at the ADUs and may flow through the third flow path 110 via the third flow control device 12C to the one or more ADUs 20. The third flow control device 12C may be throttled to provide a target flow for the ADUs 20.

Figure 7:
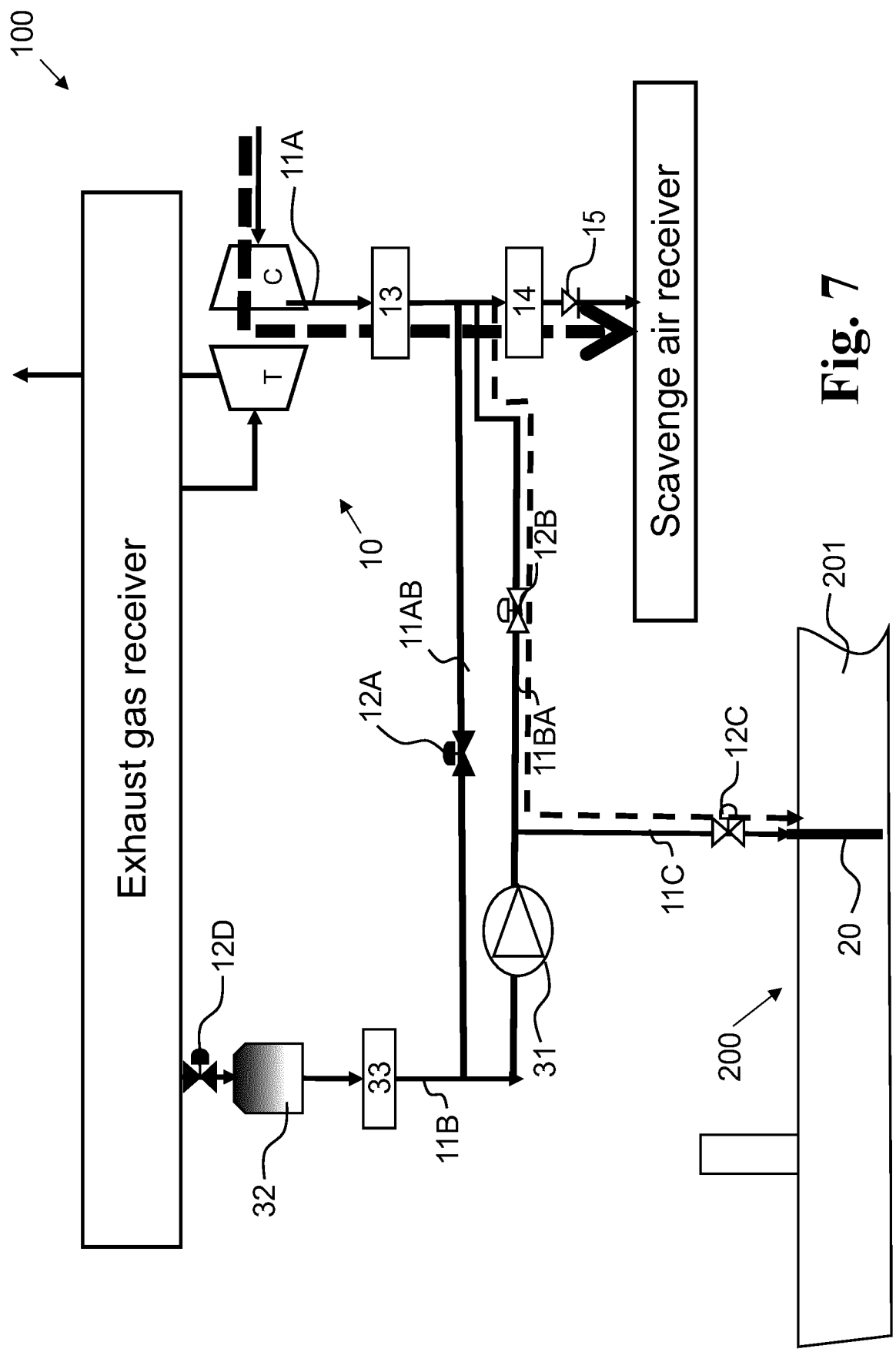

FIG. 7 discloses an example operating mode of an example air supply system disclosed herein. In this example operating mode, the air supply system 10 operates in IMO Tier 2 mode with air being supplied to the ADUs 20. The engine of the vessel operates at a load above the load threshold, so that the pressure of the compressed air from the turbocharger 10 is sufficient to overcome the discharge pressure at the ADUs 20. The second flow control device 12B and the third flow control device 12C are configured to be open, as indicated by the valves being white in the figure. The first flow control device 12A and the fourth flow control device 12D are configured to be closed, so that a flow through the first connecting path 11AB and a flow of exhaust gas through the second flow path 11B is prevented. A sub-flow of air is extracted from the first flow path 11A through the second connecting path 11BA and routed via the second connecting path 11BA to the third flow path 110, such that the blower 31 of the EGR system 30 is bypassed. Since the pressure of the sub-flow of compressed air is higher than the discharge pressure at the ADUs, the sub-flow of compressed air flows through the third flow path 110 via the open third flow control device 12C to the one or more ADUs 20 in the hull 201 of the vessel 200. By bypassing the blower, pressure losses in the sub-flow of compressed air may be reduced since the route via the second connecting path 11BA has less restrictions than the route via the first connecting path 11AB and the blower 31. The third flow control device 12C and/or the second flow control device 12B may be throttled to provide a target flow for the ADUs 20. The same operating mode may be applied to the example air supply system 100 of FIG. 3 comprising more than one turbocharger, such as comprising the first turbocharger 10 and the second turbocharger 10A. The sub-flow of air to the ADUs 20 is thus extracted from the first flow path 11A via the second connecting path 11BA and supplied to the ADUs 20 via the third flow path 110.

Figure 8A:
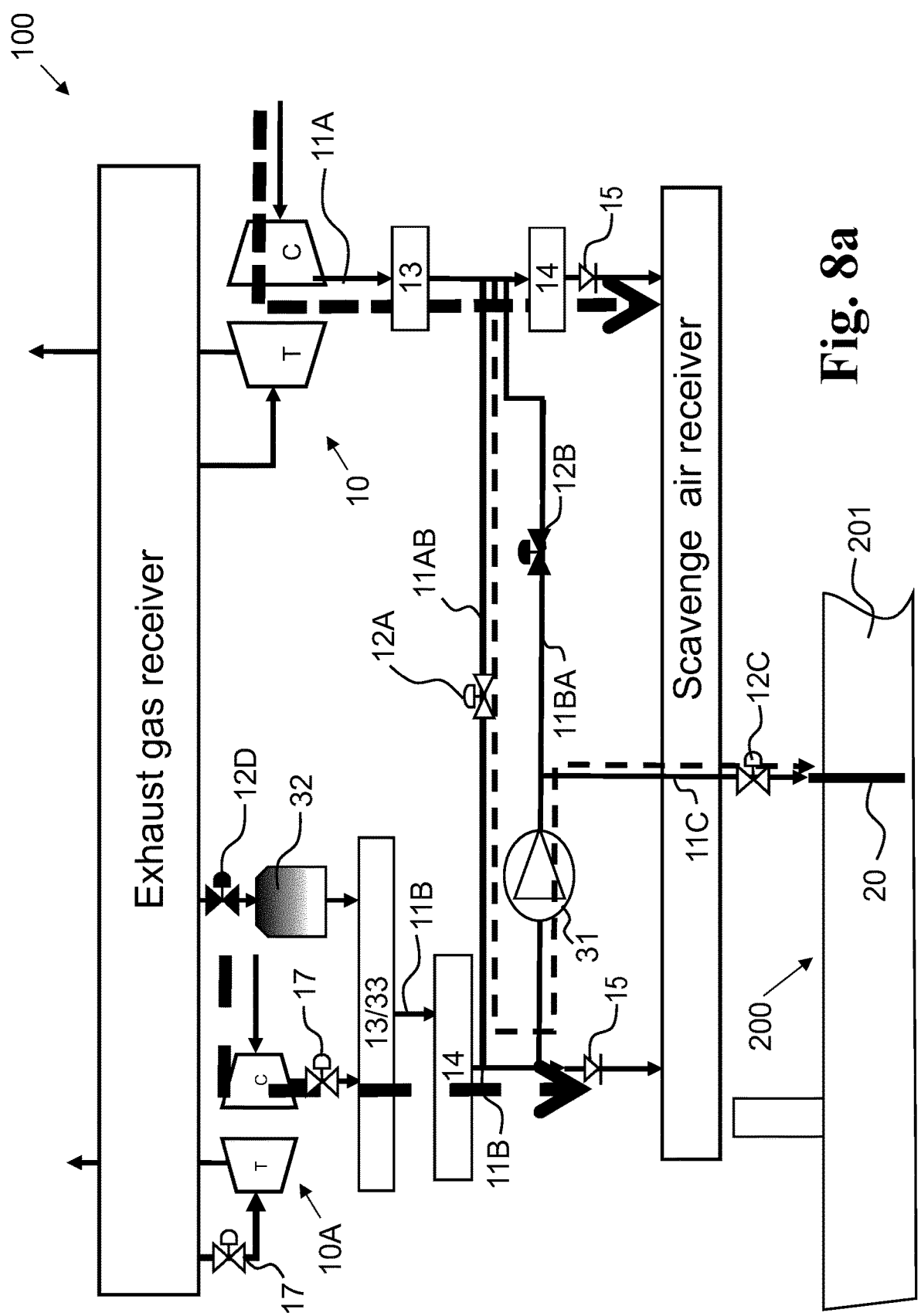

FIG. 8a shows the same operating mode as shown in FIG. 7, but for an air supply system 100 comprising more than one turbocharger, such as the air supply system 100 shown in FIG. 3. For the example air supply system comprising more than one turbocharger, such as comprising the first turbocharger 10 and the second turbocharger 10A, the one or more cut out valves 17 may be opened as indicated by the white valves in FIG. 8, so that the exhaust gas flow to the turbocharger 10A is allowed. The cut-out valves 17 may for example be opened upon the pressure of the compressed air from the first turbocharger 10 being above the discharge pressure at the ADUs 20, or when the first turbocharger 10 has reached a maximum load limit. The first flow control device 12A and the third flow control device 12C are configured to be open, as indicated by the valves being white in the figure. The second flow control device 12B and the fourth flow control device 12D are configured to be closed, so that a flow through the second connecting path 11BA and a flow of exhaust gas through the second flow path 11B is prevented. A sub-flow of compressed air, as indicated by the dashed line in the FIG. 8a, is extracted from the first flow path 11A through the first connecting path 11AB and routed via the second flow path 11B, where the sub-flow of compressed air from the first turbocharger mixes with the flow of compressed air from the second turbocharger 10A. A sub-flow of the mixed compressed air is extracted from the second flow path via the blower 31 of the EGR system 30, where the pressure of the sub-flow of air may be further boosted by the blower 31. If the pressure of the sub-flow of air is higher than the capacity of the blower 31, the blower may windmill in the sub-flow of compressed air. The sub-flow of the mixed compressed air then flows through the third flow path 110 via the open third flow control device 12C to the one or more ADUs 20.

Figure 8B:
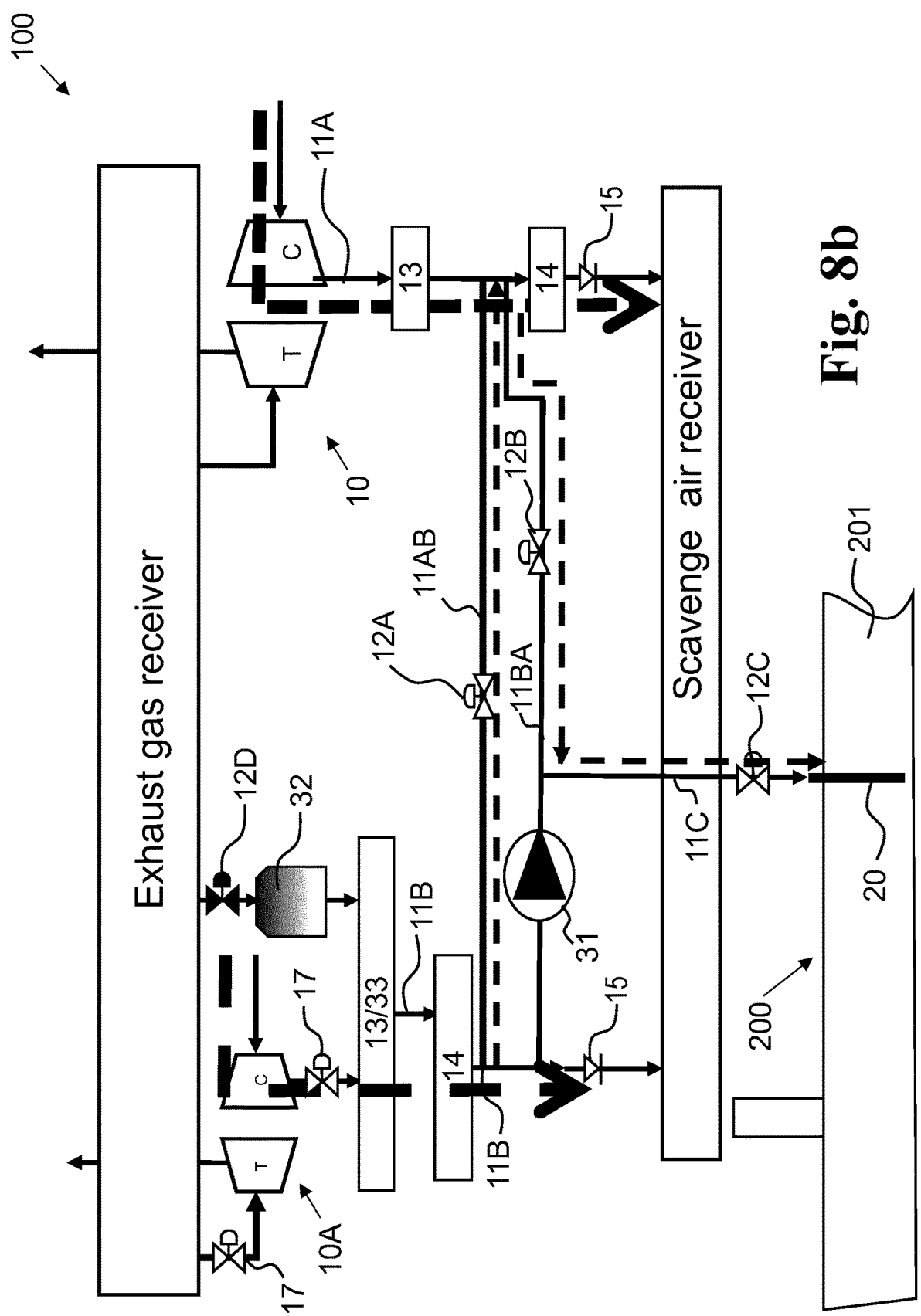

FIG. 8b shows a further operating mode of the example air supply system 100 comprising more than one turbocharger. Upon the pressure of the sub-flow of air provided by the plurality of turbochargers, such as the first and the second turbochargers 10, 10A is higher than the capacity of the blower 31, instead of the blower 31 windmilling in the sub-flow of compressed air the blower may be bypassed. The first flow control device 12A and the second flow control device 12B may be opened. A sub-flow of compressed air, as indicated by the dashed line in the FIG. 8b, may be extracted from the second flow path 11B through the first connecting path 11AB and routed via the first flow path 11A, where the sub-flow of compressed air from the first turbocharger 10 mixes with the flow of compressed air from the second turbocharger 10A. A sub-flow of the mixed compressed air is extracted from the first flow path via second connecting path 11BA and then flows through the third flow path 110 via the open third flow control device 12C to the one or more ADUs 20. This may be the case when the air supply system 100 operates in Tier 2 mode and the engine operates at high load, such as at a load level above the load threshold.

Figure 9:
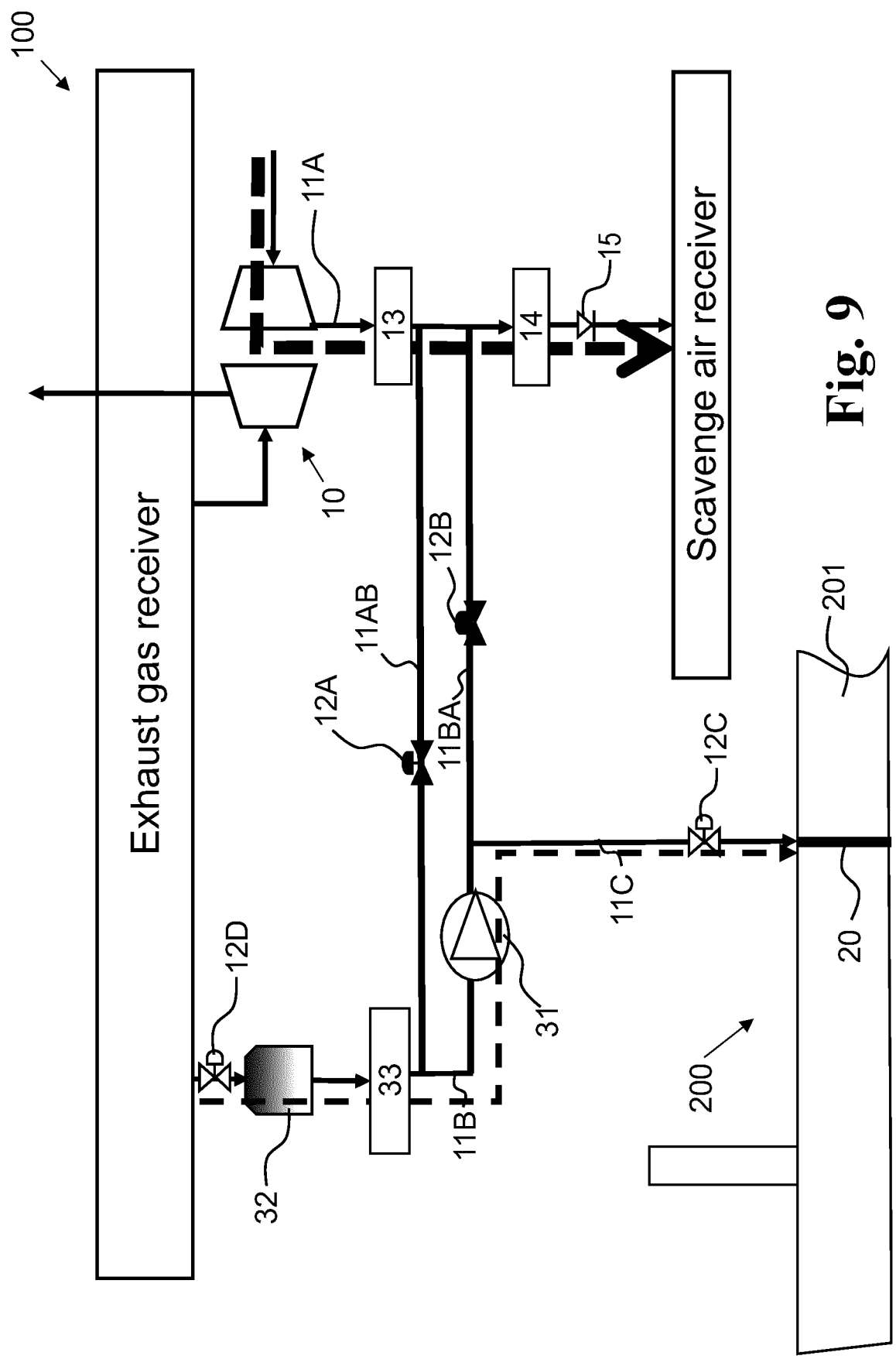

FIG. 9 discloses an example operating mode of an example air supply system disclosed herein. In the operating mode shown in FIG. 10 the air supply system 10 operates in IMO Tier 2 mode. The third flow control device 12C and the fourth flow control device 12D are open, while the first flow control device 12A and the second flow control device are closed. The exhaust gas can thus flow through the second flow path 11B via the scrubber 32 and the blower 31 of the EGR system 30 to the third flow path 110. The cleaned, cooled and/or compressed exhaust gas flow may then be provided to the ADUs 20. The EGR system 30 may thus be used as an air source for supplying compressed air, such as clean exhaust gas, to the ADUs 20 when the air supply system is operating in IMO Tier 2 mode. Thereby, no air has to be extracted from the scavenging air flow supplied to the engine for supplying the ADUs 20 with air, thus increasing the amount of air available for the combustion process and cooling of the engine.

Figure 10:
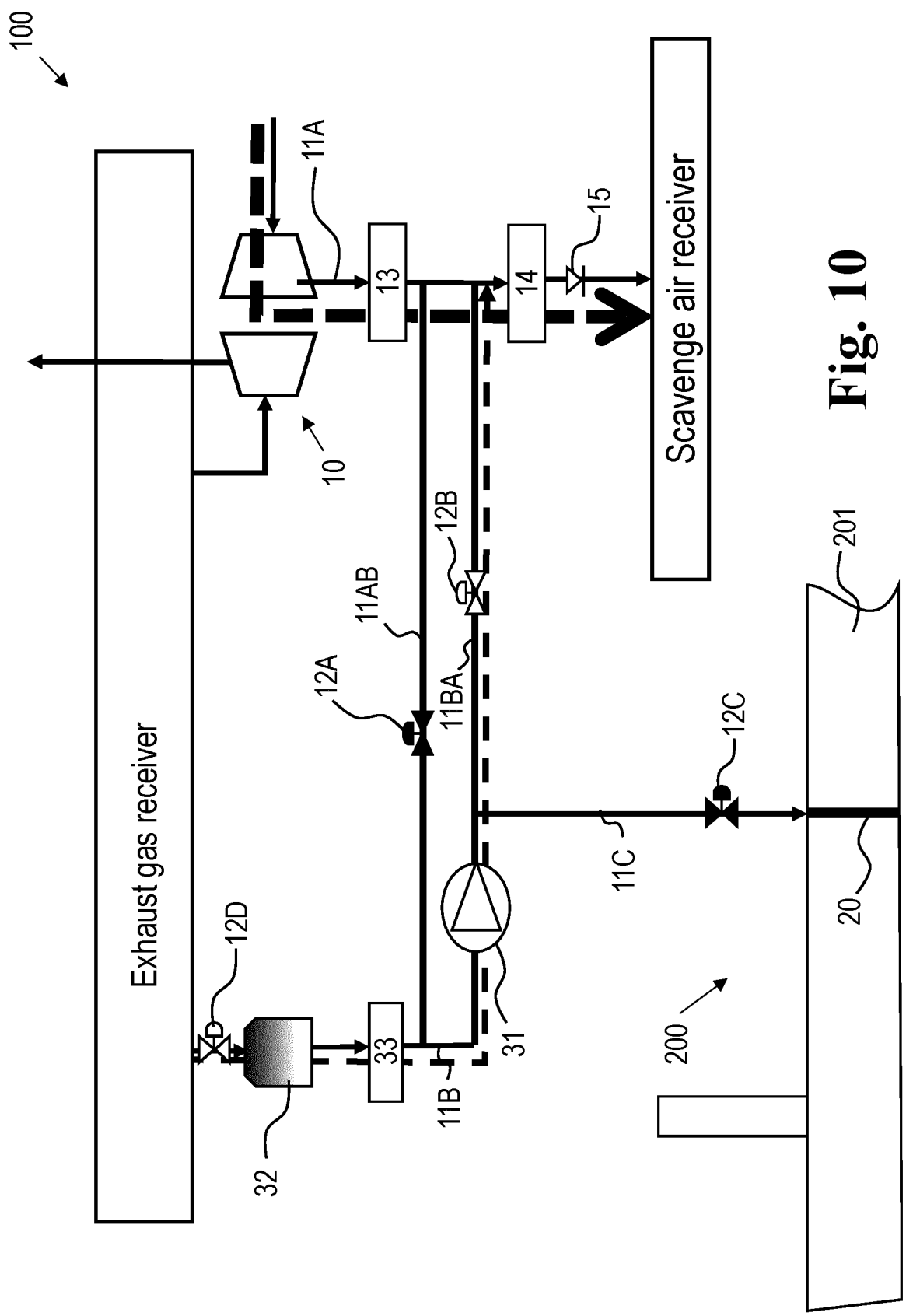

FIG. 10 discloses an example operating mode of an example air supply system disclosed herein. In the operating mode shown in FIG. 10 the air supply system 10 operates in IMO Tier 3 mode with decreased NOx emission limits. In order to meet the Tier 3 NOx emission limits, the EGR system is activated. The fourth flow control device 12D is opened, as indicated by the white valve 12D, so that an exhaust gas flows through the second flow path 11B via the scrubber 32. The second flow control device 12B is also opened. The first flow control device 12A and the third flow control device 12C are configured to be closed, as indicated by the valves being black in the figure. Hence, no air will be supplied to the ADUs 20. The cleaned exhaust gas is routed via the blower 31 of the EGR system 30 and the second connecting path 11BA to the first flow path 11A, where the exhaust gas is mixed with the compressed air flow from the turbocharger 10. The flow of exhaust gas is thus fed into the first flow path 11A via the blower 31 of the EGR system 30 and the second connecting path 11BA. The exhaust gas may be mixed with the compressed air flow upstream of the water mist catcher 14, so that moisture is removed when the mixed flow passes through the water mist catcher 14 before it enters the scavenging air receiver and is provided to the engine.

Although, the operating mode of FIG. 10 is disclosed for the example air supply system 100 comprising only one turbocharger 10, the same operating mode may also be used with the example air supply system of FIG. 3, comprising two or more turbochargers. The operating mode may further be combined with turbocharger cut-out, by closing the cut-out valves 17 of the second turbocharger 10A, wherein the operation of the air supply system corresponds to the air supply system 100 comprising only one turbocharger 10, such as disclosed in FIG. 10.

Figure 11:
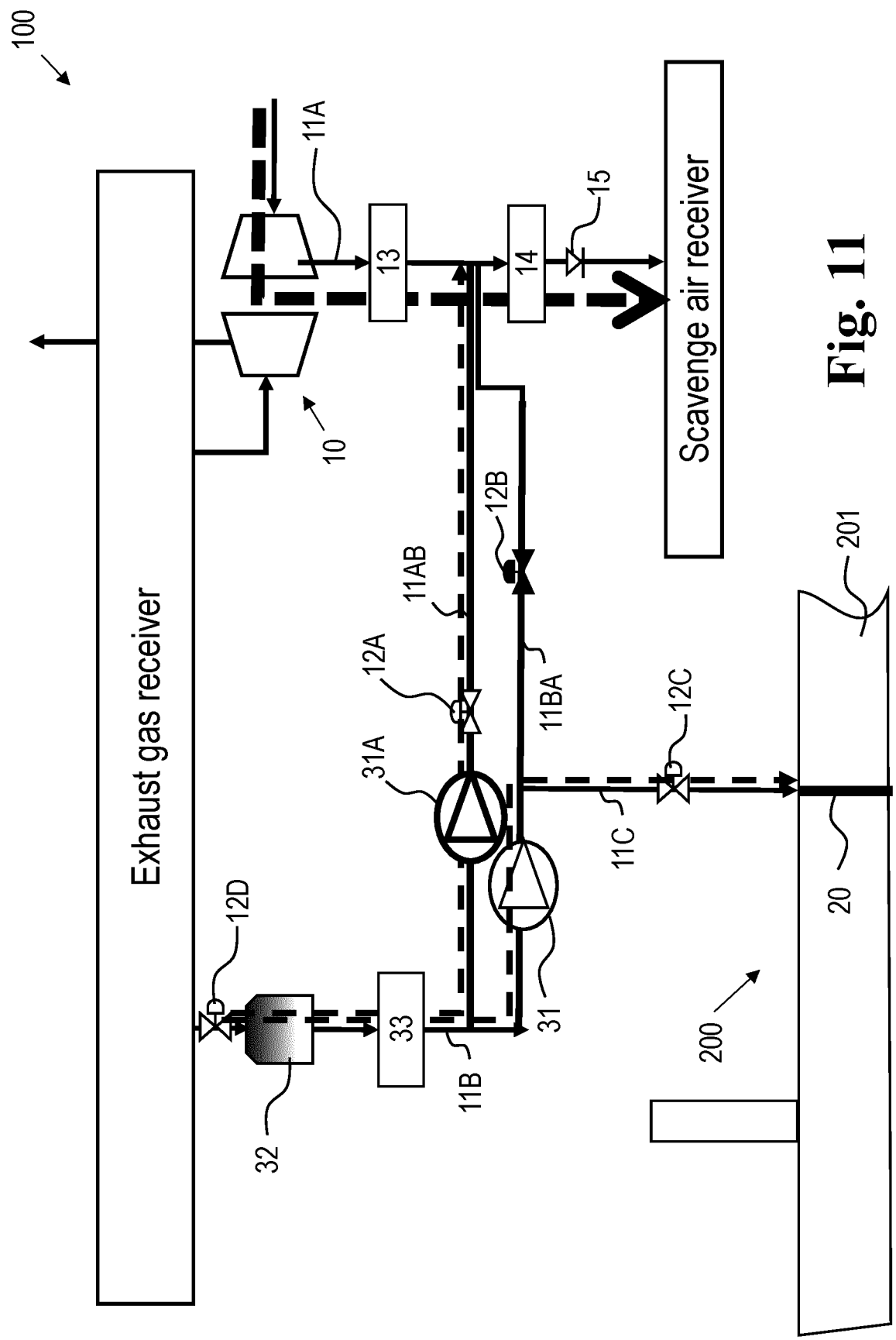

FIG. 11 discloses an example operating mode of an example air supply system disclosed herein. In the operating mode shown in FIG. 11 the air supply system 10 operates in IMO Tier 3 mode with decreased, such as stricter, NOx emission limits. In order to meet the Tier 3 NOx emission limits, the EGR system is activated. The fourth flow control device 12D is opened, as indicated by the white valve 12D, so that an exhaust gas flows through the second flow path 11B via the scrubber 32. The first flow control device 12A and the third flow control device 12C are open, as indicated by the valves being white in the figure. The second flow control device 12B is closed. The air supply to the ADUs 20 is thus active and cleaned exhaust gas is routed via the blower 31 of the EGR system 30 and the second connecting path 11BA to the third flow path 110. The first connecting path 11AB is also open so that the cleaned exhaust gas is routed via the first connecting path 11AB to the first flow path 11A, where the exhaust gas is mixed with the compressed air flow from the turbocharger 10. The exhaust gas may be mixed with the compressed air flow upstream of the water mist catcher 14, so that moisture is removed when the mixed flow passes through the water mist catcher 14 before it enters the scavenging air receiver and is provided to the engine. In order to enhance the flow through the first connecting path 11AB, an additional blower 31A may be provided in the first connecting path 11AB. In some example air supply systems, the blower 31 may be in connected to both the first connecting path 11AB and the second connecting path 11BA. In some example air supply systems 100, a dedicated blower may be provided in the first connecting path 11AB. In the operating mode shown in FIG. 11, the EGR system 30 and the supply of compressed air to the ADUs may be active simultaneously. Thereby, the NOx emissions may be reduced to achieve IMO Tier 3 emission limits, while the efficiency of the vessel is further improved by reducing the resistance of the vessel in the water. The operating mode disclosed in FIG. 11 may correspondingly also be applied to the example air supply system 100 disclosed in FIG. 3.

Figure 12:
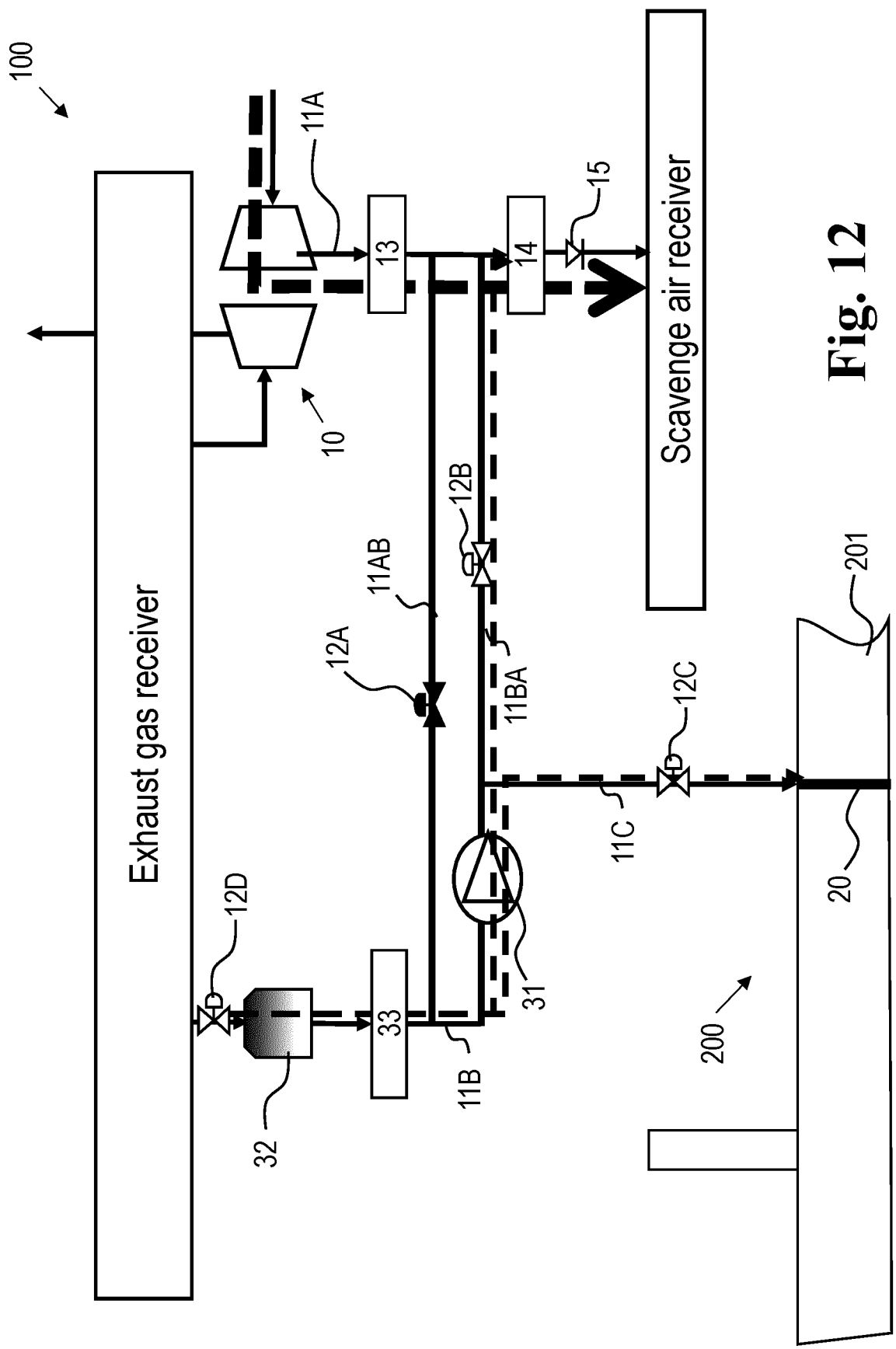

FIG. 12 discloses an example operating mode of an example air supply system disclosed herein. In the operating mode shown in FIG. 12 the air supply system 10 also operates in IMO Tier 3 mode with decreased, such as stricter, NOx emission limits. In order to meet the Tier 3 NOx emission limits, the EGR system is activated. The fourth flow control device 12D is opened, as indicated by the white valve 12D, so that an exhaust gas flows through the second flow path 11B via the scrubber 32. The second flow control device 12B and the third flow control device 12C are open, as indicated by the valves being white in the figure. The first flow control device 12A is closed. The air supply to the ADUs 20 is thus active and cleaned exhaust gas is routed via the blower 31 of the EGR system 30 through the second connecting path 11BA to the first flow path 11A and the third flow path 110. A first sub-flow of the cleaned exhaust gas is provided to the first flow path 11A where the exhaust gas is mixed with the compressed air flow from the turbocharger 10. The exhaust gas may be mixed with the compressed air flow upstream of the water mist catcher 14, so that moisture is removed when the mixed flow passes through the water mist catcher 14 before it enters the scavenging air receiver and is provided to the engine. A second sub-flow of the cleaned exhaust gas is provided to the third flow path 110 and further to the ADUs 20. The ratio of the first and the second sub-flow is controlled using the second flow control device 12B and the third flow control device 12C. The second flow control device 12B and the third flow control device 12C may be control valves. The second flow control device 12B and the third flow control device 12C may be throttled, such as being controlled, to provide the desired flow ratio. The ratio may depend on the amount of exhaust gas required by the combustion process in the engine to achieve the IMO Tier 3 or 2 emission limits. In the operating mode shown in FIG. 12, the EGR system 30 and the supply of compressed air to the ADUs 20 may be active simultaneously. Thereby, the NOx emissions may be reduced to achieve IMO Tier 3 emission limits, while the efficiency of the vessel is further improved by reducing the resistance of the vessel in the water. The operating mode disclosed in FIG. 12 may correspondingly also be applied to the example air supply system 100 disclosed in FIG. 3.

It shall be noted that the features mentioned in the embodiments described in FIGS. 2-12 are not restricted to these specific embodiments. Any features relating to the operating modes for the air supply system comprising a single turbocharger and the components comprised therein and mentioned in relation to the air supply system of FIG. 2, such as the operation of the flow control devices, are thus also applicable to the air supply system comprising more than one turbochargers as described in relation to FIG. 3.

Embodiments of products (air supply system and vessel) according to the disclosure are set out in the following items:

Item 1. An air supply system (100) for supplying air to an outside of a hull (201) of a vessel (200), the vessel (200) comprising an engine, the air supply system (100) comprising:
one or more turbocharger(s) (10) for supplying a compressed main air flow to the engine of the vessel via a respective first flow path (11A),
an exhaust gas recirculation, EGR, system (30) for recirculating exhaust gas into the compressed main air flow supplied to the engine via a second flow path (11B) and
a third flow path (110) for supplying a sub-flow of compressed air to one or more air discharge units, ADUs, (20), wherein the one or more ADUs (20) are configured to be arranged in the hull (201) of the vessel (200) below a waterline,
wherein the EGR system (30) comprises a blower (31) arranged in the second flow path (11B) for supplying exhaust gas to the engine,
wherein the first flow path (11A) and the second flow path (11B) have a first connecting path (11AB) upstream of the blower (31) and a second connecting path (11BA) downstream of the blower (31), for providing a fluid connection between the first flow path and the second flow path, and
wherein the third flow path (110) is in fluid connection with the first flow path (11A) and the second flow path (11B) downstream of the blower (31), such that the sub-flow of compressed air can be extracted from the first flow path (11A) and/or the second flow path (11B).

Item 2. The air supply system (100) of Item 1, the air supply system (100) comprising a first flow control device (12A) for controlling a flow through the first connecting path (11AB) between the first flow path (11A) and the second flow path (11B), a second flow control device (12B) for controlling a flow through the second connecting path (11BA) between the first flow path (11A) and the second flow path (11B), a third flow control device (12C) for controlling a flow through the third flow path (110), and/or a fourth flow control device (12D) for controlling a flow of exhaust gas into the second flow path (11B).

Item 3. The air supply system (100) according to any one of the previous Items, wherein the air supply system (100) comprises two or more turbocharger(s) (10, 10A), wherein the air supply system (100) further comprises one or more cut out valves (17) for controlling an exhaust gas flow to at least a first turbocharger (10A) of the two or more turbochargers (10, 10A).

Item 4. The air supply system (100) according to Item 2, wherein, in a first operating mode, the first flow control device (12A) and the third flow control device (12C) are configured to be opened and the second flow control device (12B) and fourth flow control device (12D) are configured to be closed, so that a flow of exhaust gas through the second flow path (11B) is prevented and a sub-flow of air is extracted from the first flow path (11A) and routed via the first connecting path (11AB) via the blower (31) of the EGR system (31) to the ADUs (20).

Item 5. The air supply system (100) according to Item 4, wherein, in a second operating mode, the one or more cut out valves (17) are closed, so that the exhaust gas flow to at least the first turbocharger (10A) of the two or more turbochargers (10) is prevented.

Item 6. The air supply system (100) according to Item 4 or 5, wherein, in a third operating mode, the one or more cut out valves (17) are open, so that the exhaust gas flow to at least the first turbocharger (10A) of the two or more turbochargers (10) is allowed.

Item 7. The air supply system (100) according to any one of the Items 1 to 6, wherein, in a fourth operating mode, the first flow control device (12A) and the third flow control device (12C) are configured to be closed and the second flow control device (12B) and fourth flow control device (12D) are configured to be open, so that a flow of exhaust gas through the second flow path (11B) is allowed and fed into the first flow path (11A) via the blower (31) of the EGR system (30) and the second connecting path (11BA).

Item 8. The air supply system (100) according to any one of the Items 1 to 7, wherein, in a fifth operating mode, the second flow control device (12B) and the third flow control device (12C) and the fourth flow control device (12D) are configured to be open and the first flow control device (12A) is configured to be closed, so that a flow of exhaust gas through the second flow path (11B) is allowed and fed into the first flow path (11A) and the third flow path (110) via the blower (31) of the EGR system (31) and the second connecting path (11BA).

Item 9. The air supply system (100) according to any one of the previous Items, wherein the EGR system (30) comprises a scrubber (32) arranged in the second flow path (11B) for cleaning the exhaust gas, wherein the scrubber is arranged upstream of the blower (31) and the first connecting path (11AB).

Item 10. A vessel (200) comprising an engine and the air supply system (100) according to any one of the Items 1-9.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It is to be noted that the word "comprising" does not necessarily exclude the presence of other elements or steps than those listed.

It is to be noted that the words "a" or "an" preceding an element do not exclude the presence of a plurality of such elements.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly to be regarded in an illustrative rather than restrictive sense. The claimed disclosure is intended to cover all alternatives, modifications, and equivalents.

What is claimed is:

1. An air supply system for supplying air to an outside of a hull of a vessel, the vessel comprising an engine, the air supply system comprising:
   one or more turbocharger(s) for supplying a compressed main air flow to the engine of the vessel via a respective first flow path,
   an exhaust gas recirculation, EGR, system for recirculating exhaust gas into the compressed main air flow supplied to the engine via a second flow path and
   a third flow path for supplying a sub-flow of compressed air to one or more air discharge units, ADUs, wherein the one or more ADUs are configured to be arranged in the hull of the vessel below a waterline,
   wherein the EGR system comprises a blower arranged in the second flow path for supplying exhaust gas to the engine,
   wherein the first flow path and the second flow path have a first connecting path upstream of the blower and a second connecting path downstream of the blower, for providing a fluid connection between the first flow path and the second flow path, and
   wherein the third flow path is in fluid connection with the first flow path and the second flow path downstream of the blower, such that the sub-flow of compressed air can be extracted from the first flow path and/or the second flow path.

2. The air supply system of claim 1, the air supply system comprising a first flow control device for controlling a flow through the first connecting path between the first flow path and the second flow path, a second flow control device for controlling a flow through the second connecting path between the first flow path and the second flow path, a third flow control device for controlling a flow through the third flow path, and/or a fourth flow control device for controlling a flow of exhaust gas into the second flow path.

3. The air supply system according to claim 2, wherein, in a first operating mode, the first flow control device and the third flow control device are configured to be opened and the second flow control device and fourth flow control device are configured to be closed, so that a flow of exhaust gas through the second flow path is prevented and a sub-flow of air is extracted from the first flow path and routed via the first connecting path via the blower of the EGR system to the ADUs.

4. The air supply system according to claim 1, wherein the air supply system comprises two or more turbocharger(s), wherein the air supply system further comprises one or more cut out valves for controlling an exhaust gas flow to at least a first turbocharger of the two or more turbochargers.

5. The air supply system according to claim 4, wherein, in a second operating mode, the one or more cut out valves are closed, so that the exhaust gas flow to at least the first turbocharger of the two or more turbochargers is prevented.

6. The air supply system according to claim 4, wherein, in a third operating mode, the one or more cut out valves are open, so that the exhaust gas flow to at least the first turbocharger of the two or more turbochargers is allowed.

7. The air supply system according to claim 1, wherein, in a fourth operating mode, the first flow control device and the third flow control device are configured to be closed and the second flow control device and fourth flow control device are configured to be open, so that a flow of exhaust gas through the second flow path is allowed and fed into the first flow path via the blower of the EGR system and the second connecting path.

8. The air supply system according to claim 1, wherein, in a fifth operating mode, the second flow control device and the third flow control device and the fourth flow control device are configured to be open and the first flow control device is configured to be closed, so that a flow of exhaust gas through the second flow path is allowed and fed into the first flow path and the third flow path via the blower of the EGR system and the second connecting path.

9. The air supply system according to claim 1, wherein the EGR system comprises a scrubber arranged in the second flow path for cleaning the exhaust gas, wherein the scrubber is arranged upstream of the blower and the first connecting path.

10. A vessel comprising an engine and the air supply system according to claim 1.

* * * * *